United States Patent
Chu et al.

(10) Patent No.: US 8,997,676 B2
(45) Date of Patent: Apr. 7, 2015

(54) RETRACTABLE TRIM VANE FOR AMPHIBIOUS VEHICLE

(71) Applicant: BAE Systems Land & Armaments, L.P., Santa Clara, CA (US)

(72) Inventors: Peter C. Chu, San Mateo, CA (US); Michael Kevin McCullough, San Jose, CA (US); John J. Brownfield, Los Gatos, CA (US)

(73) Assignee: BAE Systems Land & Armaments, L.P., Santa Clara, CA (US)

( * ) Notice: Subject to any disclaimer, the term of this patent is extended or adjusted under 35 U.S.C. 154(b) by 51 days.

(21) Appl. No.: 13/755,849

(22) Filed: Jan. 31, 2013

(65) Prior Publication Data

US 2013/0192507 A1  Aug. 1, 2013

Related U.S. Application Data

(60) Provisional application No. 61/593,066, filed on Jan. 31, 2012.

(51) Int. Cl.
  *B63B 1/32*  (2006.01)
  *F41H 7/02*  (2006.01)
  *B60F 3/00*  (2006.01)

(52) U.S. Cl.
  CPC .. *B63B 1/32* (2013.01); *F41H 7/02* (2013.01); *B60F 3/0038* (2013.01)

(58) Field of Classification Search
  USPC ................. 114/284–286, 271, 282; 440/12.5, 440/12.56
  See application file for complete search history.

(56) References Cited

U.S. PATENT DOCUMENTS

| | | | |
|---|---|---|---|
| 3,327,671 A | * | 6/1967 | Comins .......................... 114/285 |
| 4,953,492 A | | 9/1990 | Duffty |
| 7,530,866 B2 | * | 5/2009 | Darby et al. ................. 440/12.5 |

FOREIGN PATENT DOCUMENTS

| | | |
|---|---|---|
| EP | 0416539 B1 | 4/1994 |
| JP | 2000-301922 | 10/2000 |
| KR | 10-2003-0041003 | 5/2003 |
| KR | 10-2004-0085668 | 10/2004 |

OTHER PUBLICATIONS

International Search Report and Written Opinion for PCT Application PCT/US2013/024105, dated May 30, 2013, 10 pgs.
International Preliminary Report on Patentability from related PCT Application PCT/US2013/024105, dated Aug. 14, 2014, 7 pgs.

* cited by examiner

*Primary Examiner* — Edwin Swinehart
(74) *Attorney, Agent, or Firm* — Patterson Thuente Pedersen, P.A.

(57) ABSTRACT

A trim vane assembly for amphibious armored vehicles and having a trim vane movable along a generally horizontal path between a deployed position in which the trim vane extends rearward from the vehicle and a stowed position in which the trim vane is positioned beneath the amphibious vehicle. In the retracted position, the trim vane movable is flush against or received within the vehicle bottom such that the trim vane supplements the belly armor. Similarly, the trim vane extends from or overlaps with the bottom of the vehicle when extended into the deployed position to provide continuous bottom face of the vehicle extending from the front of the vehicle to the end of the trim vane. Conventional trim vanes are rotated between a vertical orientation against the rear of the vehicle and a horizontal position extending from the rear of the vehicle reducing viscous drag.

14 Claims, 4 Drawing Sheets

RETRACTABLE TRIM VANE FOR AMPHIBIOUS VEHICLE

RELATED APPLICATION

The present application claims the benefit of U.S. Provisional Application No. 61/593,066 entitled RETRACTABLE WATER MODE TRIM VANE and filed Jan. 31, 2012, which is incorporated herein in its entirety.

FIELD OF THE INVENTION

The present invention is generally directed to a deployable trim vane assembly for improving the hydrodynamic characteristics of amphibious vehicles. Specifically, the present invention is directed to a deployable trim vane movable between a deployed position in which the trim vane extends rearward from the back of the vehicle to improve the hydrodynamics of the vehicle and a retracted position in which the trim vane is positioned beneath the vehicle for improving the ballistic and mine protection of the underside of the vehicle.

BACKGROUND OF THE INVENTION

Amphibious vehicles are dual role vehicles having wheels or tracks for moving on land and a water tight hull with a water propulsion means for moving across the water. The inherent challenge of amphibious vehicles is providing sufficient buoyancy to counteract the weight of the vehicle in a vehicle shape suitable for navigating on land. With ordinary amphibious vehicles, a water tight hull provides sufficient water displacement to permit the amphibious vehicle to navigate through the water even if the hull closely resembles the land base equivalent. Additional floatation devices are often attached to the amphibious vehicles during aquatic travel to improve the ratio of the vehicle weight to the water displacement and removed from the vehicle for travel across land.

With armored military vehicles, the additional weight of the armor plating can increase the weight of the vehicle past the maximum possible buoyancy generated by water displacement alone. Similarly, amphibious military vehicles are often employed in situations where the vehicle must quickly alternate between aquatic and land travel or under fire when leaving or entering the water making the attachment or removal of floatation devices impractical or dangerous.

In order to mitigate the effects of the heavier armor required under current threat conditions, many conventional and amphibious armored vehicles often have heavier armor plating at the sides of the vehicle with thinner armor on the top and bottom of the vehicle. The arrangement maximizes protection on the sides of the vehicle most likely to be struck by ballistic threats while reducing the overall armor and weight of the vehicle by providing thinner armor on the portion of the vehicle least likely to be struck. However, the increased use of improvised explosive devices ("IEDs") and other mine-type weapons that exploit the thinner belly armor have dramatically increased in recent years presenting a substantial risk. The contrasting concern is that adding additional armor to the belly armor can reduce the buoyancy of the vehicle.

Trim vanes are often employed to account for the poor buoyancy of the armored amphibious vehicles. As depicted in FIGS. 1 and 2, trim vanes 104 are most commonly positioned on the bow 102 of amphibious vehicle 100 such that the vane 104 can be positioned to extend forward and upwards from the bow 102 when the amphibious vehicle 100 is to be operated in water. The bow trim vanes 104 prevent water from coming over the bow 102 of the vehicle 100 and swamping the vehicle 100. Certain trim vanes 104 can also increase the effective length of the vehicle 100 improving the water displacement of the vehicle 100 and accordingly the buoyancy of the vehicle 100. The inherent drawback of the bow 102 mounted trim vanes 104 is that the upward orientation of the trim vanes 104 can interfere with the driver's vision. The trim vanes 104 are lowered and secured to avoid bouncing into the driver's vision during travel on land often requiring vehicle personnel to move to the bow 102 of the vehicle 100 and manually lower the trim vane 104 thus exposing the personnel to hostile fire.

The trim vanes are also often mounted at the stern of both watercraft and amphibious vehicles to adjust the direction the propulsion system outflow (herein referred to as vectoring) and change the longitudinal pitch of the vehicle (herein referred to as trim) to cause the vehicle to ride higher in the water to reduce drag and improve the buoyancy of the vehicle. However, the robust construction of both bow and stern mounted trim vanes necessary to withstand the hydrodynamic forces pushing against the vehicle during aquatic travel can substantially increase the weight of the vehicle thereby often offsetting the improved buoyancy. Similarly, many stern mounted trim vanes are fitted with an extension/retraction assembly that folds the trim vane against the rear of the vehicle during travel across land when the trim vane is not in use to prevent damage to the trim vane from obstacles during travel. The added weight of the extension/retraction assembly further increases the overall weight of the vehicle and worsens the overall buoyancy of the vehicle. Moreover, with many armored amphibious vehicles, the ingress/egress point for the vehicle is at the rear of the vehicle, which can be blocked or impeded by the refracted trim vane. As such, the trim vane must often be lowered to permit occupants to enter or exit the vehicle significantly slowing the process particularly if obstacles impede the lowering of the trim vane.

Although trim vanes are currently employed to improve the buoyancy of armored amphibious vehicles, the presently available trim vanes have significant drawbacks and can interfere with the vehicles function. Moreover, use of trim vanes frequently require a reduction in armor due to the overall weight of the vehicle thus increasing the risk for armored amphibious vehicles from IEDs and other explosives.

SUMMARY OF THE INVENTION

The present invention is directed to a trim vane assembly for an amphibious vehicle and comprising a trim vane movable along a generally horizontal path between a deployed position in which the trim vane extends rearward from the vehicle and a stowed position in which the trim vane is positioned beneath the amphibious vehicle. The horizontal path corresponds to the bottom of the vehicle such that trim vane is flush against or received within a horizontal space in the vehicle bottom such that the trim vane supplements the belly armor. Similarly, the trim vane extends from or overlaps with the bottom of the vehicle when extended into the deployed position to provide a continuous bottom face for the vehicle. Conventional stern mounted trim vanes are rotated between a vertical orientation against the rear of the vehicle and a horizontal position extending from the rear of the vehicle. The hinged arrangement typically requires a gap between the trim vane and the rear of the vehicle to allow the trim vane to rotate, which can create and effect drag. In contrast, the sliding arrangement of the present invention allows the trim vane to be extended from the rear of the vehicle without creating a gap between the trim vane and the bottom of the vehicle eliminating the end effect drag of a separated trim vane. The continuous bottom face also increases the effective surface area of the bottom of the vehicle, increases the dynamic lift of the vehicle, which in turn reduces the viscous drag of the water past the vehicle hull allowing the vehicle to travel faster and more efficiently.

In one aspect, the trim vane assembly can comprise a trim adjustment assembly for rotating the trim vane when the trim vane is positioned in the extended position. The adjustment assembly rotates the trim vane at the rear of the vehicle bottom to position the trim vane at a downward trim angle. The downward trim angle further increases the dynamic lift of the vehicle and further reduces the viscous drag on the vehicle. In this configuration, the trim vane is returned to the stowed position by rotating the trim vane into the horizontal orientation and moving the trim vane along the horizontal path.

A trim vane assembly, according to an embodiment of the present invention, comprises a trim vane, a horizontal extension assembly and at least one horizontal guide rail. In one aspect, the extension assembly can comprise a cable and winch assembly, wherein the cable can be pulled to move the trim vane along a generally horizontal path between a deployed position and a stowed position. In another aspect, the extension assembly can comprise at least one piston arm extendable and retractable to move the trim vane between the deployed position and the stowed position. The trim vane can further comprise at least one sliding element slidably engagable to the guide rail, wherein the guide rail maintains the trim vane along the horizontal path as the trim vane is moved between the deployed position and the stowed position by the extension assembly. The sliding element can comprise a wheel, a traveler or other sliding element capable of sliding along the guide rail. In this configuration, the guide rail can define a groove or track for receiving the sliding element. In operation, the guide rail can be mounted to the underside of a vehicle such that the trim vane is positioned beneath the vehicle when positioned in the stowed position and extended rearward from the vehicle when moved into the deployed position by the extension assembly.

In one aspect, the trim vane can comprise at least two sliding elements for engaging each guide rail at a minimum of two points along the guide rail to maintain the trim vane in alignment with the guide rail as the vehicle travels through the water is exposed to hydrodynamic forces. In another aspect, the trim vane assembly can further comprise an elongated rotatable support slidably affixed to the rear of the vehicle at one end and rotatably affixed to an edge of the trim vane at the opposing end. In the stowed position, the rotatable support is positioned in a generally a vertical orientation and shifts into an angled orientation as the trim vane is slid into the deployed position. In this configuration, the support limits deflection of the trim vane from the hydrodynamic forces during travel through the water. In yet another aspect, the trim vane assembly can comprise a cable support linking the trim vane to the rear of the vehicle for adjustably supporting the trim vane.

In one aspect, the trim vane assembly can further comprise a trim adjustment assembly comprising a vertical extension assembly corresponding to each guide rail. In this configuration, each guide rail comprises a hinged bracket for rotatably attaching the guide rail to the bottom of the vehicle. The vertical extension assembly can be affixed to the other end of the guide rail opposite the hinged bracket and extended or retracted to rotate the guide rail around the hinged bracket. The vertical extension assembly can comprise a cable and wire assembly, an extendable arm or other conventional means of rotating the trim vane between a horizontal or angled orientation. The relative rotation of the guide rail relative to the bottom of the vehicle alters the trim of the trim vane when the trim vane is extended.

A method of deploying a trim vane, according to an embodiment of the present invention, comprises affixing at least one guide rail to a vehicle at the underside of the vehicle, wherein the trim vane comprises at least one sliding element slidably engagable to a groove or track of the guide rail. The method further comprises sliding the guide plane along a horizontal path defined by the guide rail between a stowed position and a deployed position, wherein the guide vane overlaps with at least a portion of the belly armor of the vehicle when positioned in the stowed position and wherein the guide vane extends from the rear of the vehicle in a generally horizontal orientation when positioned in the deployed position. In one aspect, the method can further comprise rotating the guide rail around one end of the guide rail to change the orientation of the trim vane when positioned in the deployed position.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

Figure 1:
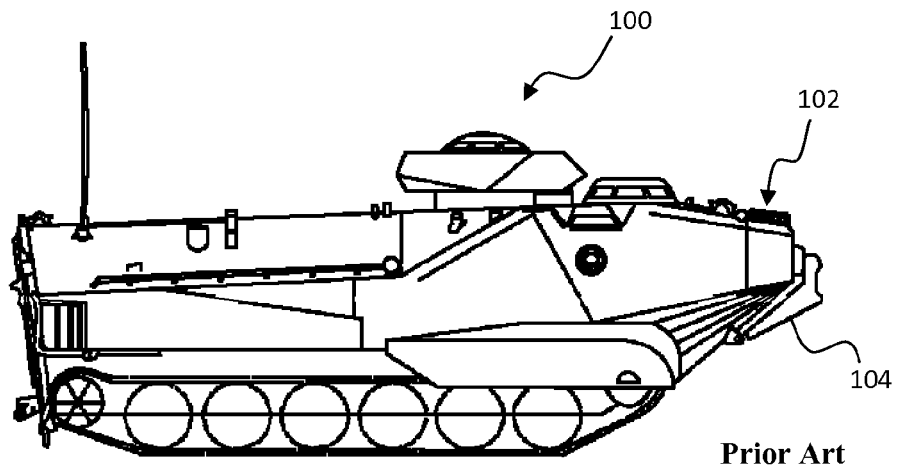
FIG. 1 is a prior art amphibious vehicle having a bow mounted trim vane, wherein the trim vane is positioned in a stowed configuration for movement of the vehicle across land.
Figure 2:
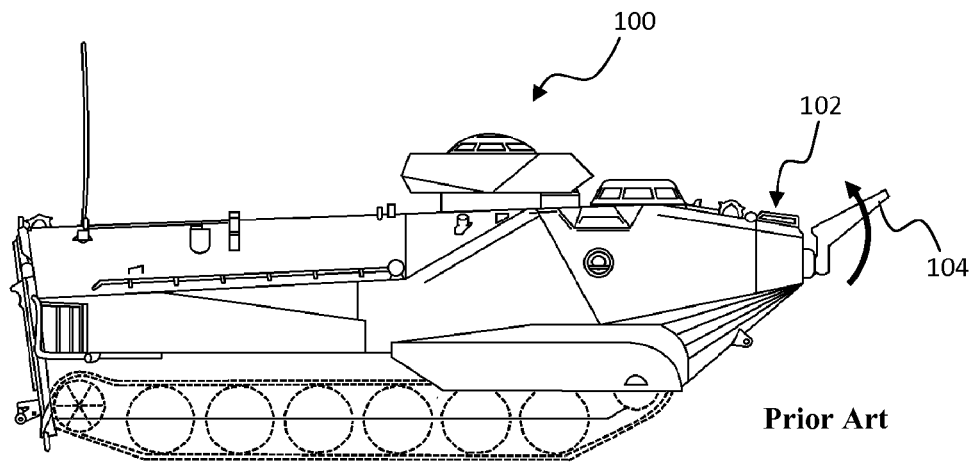
FIG. 2 is a prior art amphibious vehicle having a bow mounted trim vane, wherein the trim vane is positioned in a deployed configuration for movement of the vehicle across water.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

As depicted in FIGS. 4-8, an amphibious vehicle 20 for use with the present invention can comprise a vehicle body 22 containing a crew compartment 23 and having a front face 24, a rear face 26, two side walls 28, a top side 30 and an underside 32 comprising belly armor. As depicted, the amphibious vehicle 20 is an amphibious variant of the Bradley Fighting Vehicle. However, the present invention can function with an amphibious vehicle 20 having a generally planar underside 32. At least the underside 32 and portions of the front face 24, rear face 26 and side walls 28 are water tight to allow the vehicle body 22 to be at least partially submerged. In one aspect, the vehicle 20 can comprise at least one vehicle hatch 34 in the rear face 26 of the vehicle body 22.

As depicted in FIGS. 4-8, the vehicle 20 further comprises tank treads 34 extending below the underside 32 of the vehicle body 22 defining a space between the plane defined by the bottom of the treads 34 and the underside 32 of the vehicle body. Alternatively, the vehicle 20 can comprise wheels or other conventional means of moving a vehicle 20 across land. Similarly, the vehicle 20 can further comprise a water propulsion means such as a propeller, a paddle system, jet propulsion system or other conventional means of propelling an amphibious vehicle 20 through water. As depicted, the vehicle 20 comprises an AAV-7A1 amphibious assault vehicle, but can comprise any conventional armored amphibious vehicle. The description of vehicle 20 is not intended to be limiting, but to aid in the description of the present invention.

As depicted in FIGS. 3-6, a trim vane assembly 40, according to an embodiment of the present invention, comprises a trim vane 42, a horizontal extension assembly 44 and at least one guide rail 46. The trim vane 42 comprises a generally planar plate 48 having an inner edge 50, an outer edge 52 and two side edges 54. The plate 48 comprises a metal, a composite or other material combination of materials capable of supplementing the ballistic and explosive protection provided by the belly armor of the underside 32 of the vehicle body 22. In one aspect, the trim vane 42 can further comprise at least one sliding element 55 along at least one of the side edges 54. In this configuration, each guide rail 46 further comprises a groove 47 for receiving the sliding element 55 and guiding the plate 48 during the extension of the trim vane 42.

In operation, the guide rail 46 is affixed to the underside 32 of the vehicle body 22 such that the guide rail 46 is generally parallel to the side walls 28 of the vehicle body 22. Each sliding element 55 slidably engagable to the guide rail 46 such that the trim vane 42 is slidable along the guide rail 46 along a path defined by the guide rail 46. In one aspect, the path defined by the guide rail 46 is generally horizontal. In one aspect, the sliding element 55 can comprise a wheel, a traveler or other conventional element for receivable within the groove ## of the guide rail 46. The horizontal extension assembly 44 slides the trim vane 42 along the guide rail 46 between a deployed position and a stowed position. In the stowed position, the trim vane 48 is positioned beneath the underside 32 of the vehicle body 22 within the space between the bottom of the treads 34 and the underside 32 of the vehicle 20. Alternatively, the vehicle body 22 can comprise a horizontal slot 36 in the underside 32 of the vehicle 20 for receiving the trim vane 42. In the deployed position, the trim vane 42 extends rearward from the underside 32 of the vehicle 20 along the path defined by the guide rail 46 such that the inner edge 50 of the plate 48 overlaps with the underside 32 of the vehicle 20 to present a continuous bottom surface.

Figure 3:
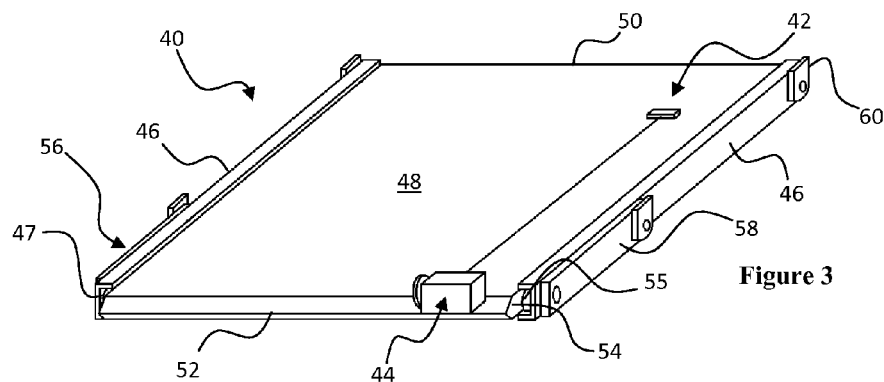
FIG. 3 is a perspective view of a trim vane assembly according to an embodiment of the present invention.
Figure 4:
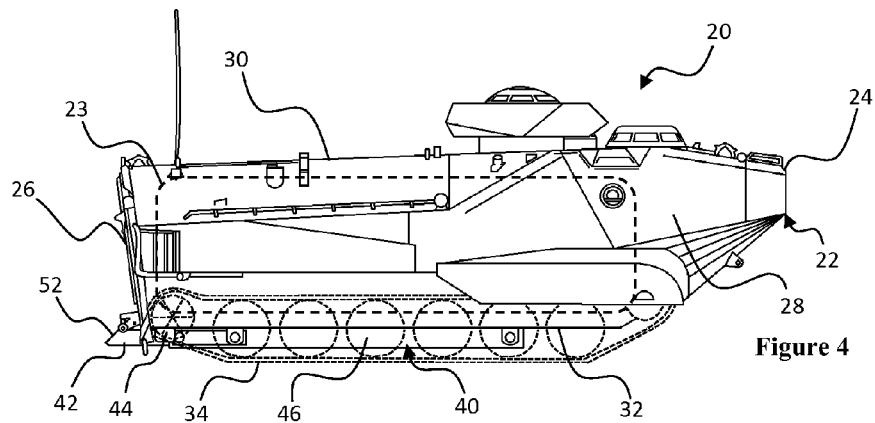
FIG. 4 is a side view of an amphibious vehicle having a trim vane assembly according to an embodiment of the present invention, wherein the trim vane assembly is positioned in the stored configuration.
Figure 5:
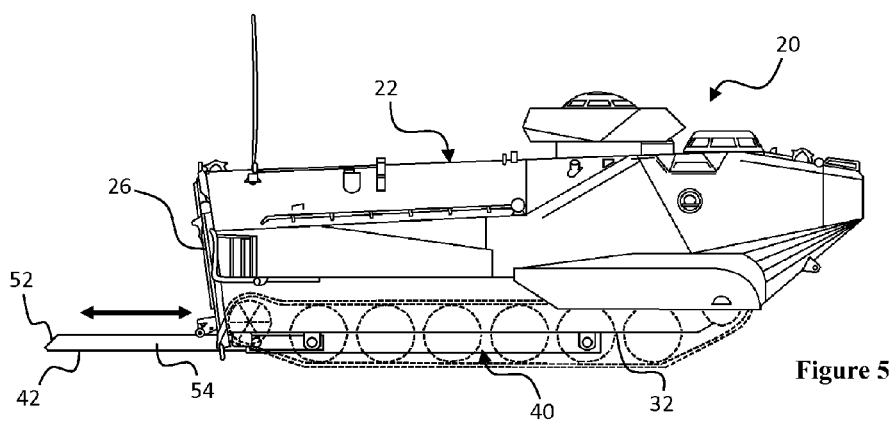
FIG. 5 is a side view of an amphibious vehicle having a trim vane assembly according to an embodiment of the present invention, wherein the trim vane assembly is positioned in the deployed configuration.
Figure 6:
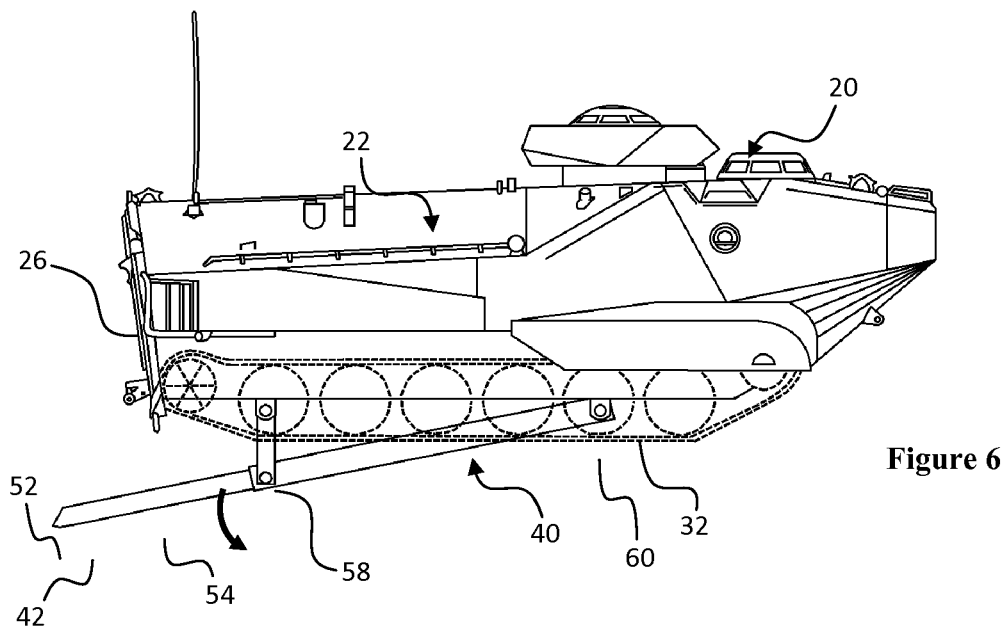
FIG. 6 is a side view of an amphibious vehicle having a trim vane assembly according to an embodiment of the present invention, wherein the trim vane assembly further comprises a trim adjustment assembly positioned to position the trim vane in a downward angle.

In one aspect, the horizontal extension assembly 44 can comprise a cable and winch system as depicted in FIG. 3 in which the cable is attached to the plate 48 such that rotating the winch moves the plate 48 between the deployed position and the stowed position. Alternatively, the horizontal extension assembly 44 can comprise a dual winch and cable assembly in which the cables and winches are arranged in opposite directions such that the winches can be independently rotated for moving the plate 48 between the deployed position and the stowed position. In another aspect, the horizontal extension assembly 44 can comprise at least one piston arm extendable and retractable to move the plate 48 between the deployed and the stowed positions.

Figure 7:
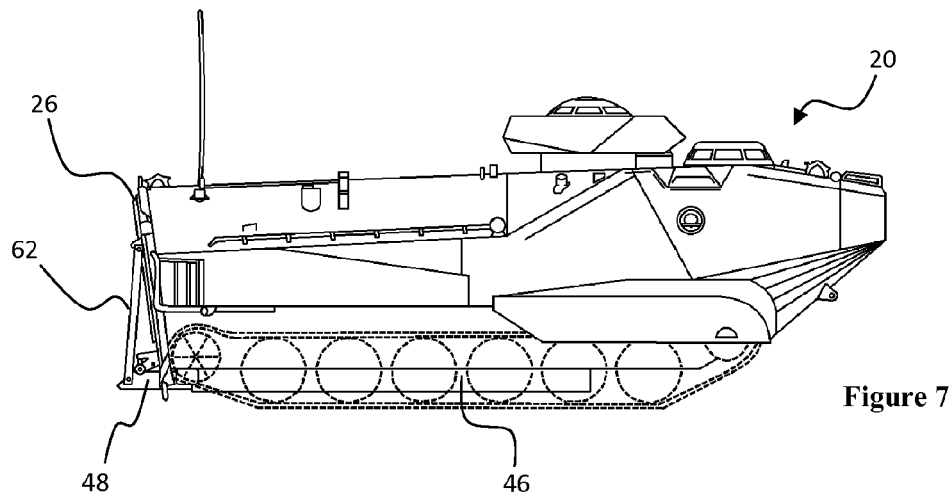
FIG. 7 is a side view of an amphibious vehicle having a trim vane assembly further comprising a sliding support, wherein the trim vane is positioned in the stored configuration.
Figure 8:
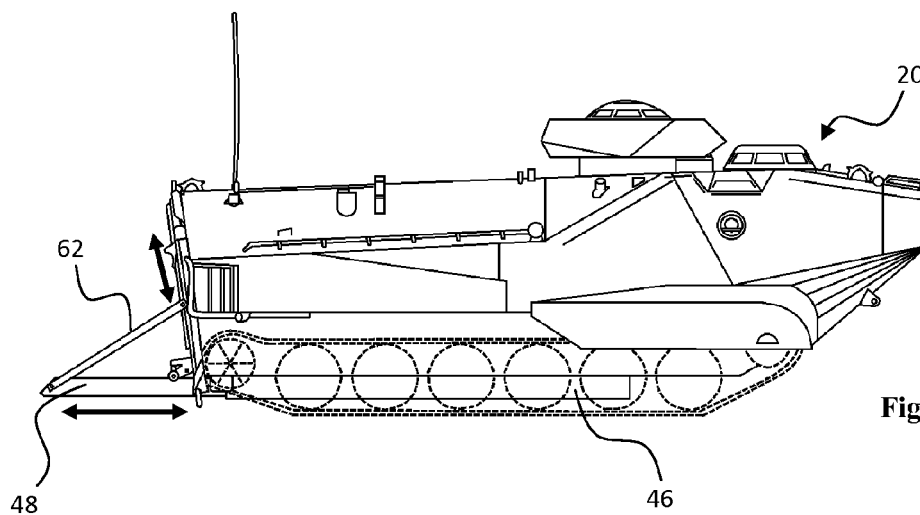
FIG. 8 is a side view of an amphibious vehicle having a trim vane assembly further comprising a sliding support, wherein the trim vane is positioned in the deployed configuration.

In one aspect, the trim vane 42 can further comprise at least two sliding element 55 corresponding to each guide rail 46 for preventing rotation of the plate 48 around a single sliding element 55. In another aspect, as depicted in FIGS. 7 and 8, the trim vane assembly 40 can comprise a rotatable support 62 slidably attached to the rear face 26 of the vehicle 20 at one end and rotatably affixed to the outer edge 52 of the plate 48 at the other end. In yet another aspect, the trim vane assembly 40 can further comprise a cable support affixed to the rear face 26 of the vehicle 20 at one end and affixed to the outer edge 52 of the plate 48 at the other end. These arrangements maintain the plate 48 in a generally horizontal orientation when the trim vane 42 is positioned in the deployed position.

In an embodiment of the present invention, the trim vane assembly 40 further comprises a trim adjustment assembly 56 for adjusting the trim angle of the trim vane 42 in the deployed position. The trim adjustment assembly 56 comprises a vertical extension assembly 58 affixed to the guide rail 46 at one end. In this configuration, the guide rail 46 further comprises a hinged bracket 60 rotatably affixing the guide rail 46 at the opposite end of the guide rail 46 from the vertical extension assembly 58. In operation, the vertical extension assembly 58 can be operated to move the end of the guide rail 46 to rotate the guide rail 46 around the hinge bracket 60 thereby changing the angle of the trim plane 42.

A method of deploying a trim vane 42, according to an embodiment of the present invention, comprises affixing at least one guide rail 46 to a vehicle 20 at the underside 32 of the vehicle 20, wherein the trim vane 42 comprises at least one sliding element 55 slidably engagable to the guide rail 46. The method further comprises sliding the trim vane 42 along a horizontal path defined by the guide rail 46 between a stowed position and a deployed position, wherein the trim vane 42 overlaps with at least a portion of the belly armor of the vehicle 20 when positioned in the stowed position and wherein the trim vane 42 extends from the rear of the vehicle in a generally horizontal orientation when positioned in the deployed position. In one aspect, the method can further comprise rotating the guide rail 46 around one end of the guide rail 46 to change the orientation of the trim vane 42 when positioned in the deployed position.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A trim vane assembly for an armored amphibious vehicle having a front face, a rear face and an underside, comprising:

a guide rail affixed to the underside of the armored amphibious vehicle defining a generally horizontal pathway; and a trim vane slidably engaged to the guide rail and movable along the guide rail by a horizontal extension assembly between a retracted position in which the trim vane substantially overlaps with the underside of the amphibious vehicle and a deployed position in which the trim vane extends rearward from the amphibious vehicle wherein the horizontal extension assembly comprises:

a cable affixed to the trim vane; and a winch assembly rotatable to wind and unwind the cable onto and off of the winch assembly to move the trim vane between the deployed position and retracted position.

2. The trim vane assembly of claim 1, wherein the trim vane further comprises a generally rectangular shape having an inner edge, an outer edge and two side edges.

3. The trim vane assembly of claim 2, further comprising:
at least two guide rails each engaging one of the side edges of the trim vane.

4. The trim vane assembly of claim 3, wherein the trim vane further comprises at least two sliding elements on each side edge of the trim vane, wherein the at least two sliding elements cooperate to prevent rotation of the trim vane out of alignment with the generally horizontal pathway.

5. The trim vane assembly of claim 4, wherein each guide rail further comprises a longitudinal channel for receiving the sliding elements and guiding the sliding elements as the trim vane is move along the generally horizontal pathway.

6. The trim vane assembly of claim 1, further comprising:
at least one rotatable support rotatably affixed at one end to the rear face and rotatably affixed to the trim vane;
wherein the rotatable support is oriented in a generally vertical orientation when the trim vane is positioned in the retracted position and oriented in an angled orientation when the trim vane is positioned in the extended position.

7. The trim vane assembly of claim 1, further comprising a trim adjustment assembly having a vertical extension assembly for rotating the trim adjustment assembly relative to the horizontal pathway;
wherein the trim vane comprises a hinged bracket slidably affixed to the guide rail such that the trim vane is movable along the horizontal pathway and rotatable to adjust the trim angle of the trim vane.

8. An amphibious vehicle, comprising:
a front face;
a rear face;
an underside;
a guide rail affixed to the underside of the armored amphibious vehicle defining a generally horizontal path;
a trim vane slidably engaged to the guide rail and movable along the guide rail by a horizontal extension assembly between a retracted position in which the trim vane substantially overlaps with the underside of the amphibious vehicle and a deployed position in which the trim vane extends rearward from the amphibious vehicle in a generally horizontal orientation; and
at least one rotatable support rotatably affixed at one end to the rear face and rotatably affixed to the trim vane;
wherein the rotatable support is oriented in a generally vertical orientation when the trim vane is positioned in the retracted position and oriented in an angled orientation when the trim vane is positioned in the extended position.

9. The amphibious vehicle of claim 8, wherein the trim vane further comprises a generally rectangular shape having an inner edge, an outer edge and two side edges.

10. The amphibious vehicle of claim 9, further comprising:
at least two guide rails each engaging one of the side edges of the trim vane.

11. The amphibious vehicle of claim 10, wherein the trim vane further comprises at least two sliding elements on each side edge of the trim vane, wherein the at least two sliding elements cooperate to prevent rotation of the trim vane out of alignment with the generally horizontal pathway.

12. The trim vane assembly of claim 11, wherein each guide rail further comprises a longitudinal channel for receiving the sliding elements and guiding the sliding elements as the trim vane is move along the generally horizontal pathway.

13. A method of deploying a trim vane from an armored amphibious vehicle having a rear side and an underside, comprising:
affixing at least one guide rail to the external underside of the vehicle, wherein the guide rail comprises an elongated channel defining a generally horizontal path;
inserting a sliding element of a planar trim vane into the elongated channel such that the elongated channel guides the trim vane in moving along the generally horizontal path;
affixing a cable to the trim vane;
activating a winch assembly that is rotatable to wind and unwind the cable onto and off of the winch assembly to move the trim vane between a deployed position and a stowed position;
sliding the trim vane along the generally horizontal path into to the stowed position in which the trim vane is substantially underneath the underside of the vehicle and is positioned generally parallel to the underside of the vehicle; and
sliding the trim vane along the generally horizontal path into the deployed position in which the trim vane extends rearward from the rear face of the vehicle at a generally horizontal orientation, wherein a portion of the trim vane overlaps with the underside of the vehicle when positioned in the deployed position.

14. The method of claim 13, further comprising:
angling the guide rail at a downward angle transverse to the underside of the vehicle when the trim vane is positioned in the deployed position.

* * * * *

UNITED STATES PATENT AND TRADEMARK OFFICE
CERTIFICATE OF CORRECTION

| | | |
|---|---|---|
| PATENT NO. | : 8,997,676 B2 | Page 1 of 1 |
| APPLICATION NO. | : 13/755849 | |
| DATED | : April 7, 2015 | |
| INVENTOR(S) | : Peter C. Chu et al. | |

It is certified that error appears in the above-identified patent and that said Letters Patent is hereby corrected as shown below:

In the specification

Column 2, Line 32:
Delete "refracted" and insert --retracted--

Column 6, Line 17:
Delete "element" and insert --elements--

In the claims

Column 7, Line 29:
Delete "move" and insert --moved--

Column 8, Line 24:
Delete "move" and insert --moved--

Column 8, Line 42:
Delete "to"

Signed and Sealed this
Seventeenth Day of May, 2016

Michelle K. Lee
*Director of the United States Patent and Trademark Office*